C. F. A. GRAY.
VEHICLE TIRE.
APPLICATION FILED NOV. 24, 1913.
1,213,476.
Patented Jan. 23, 1917.
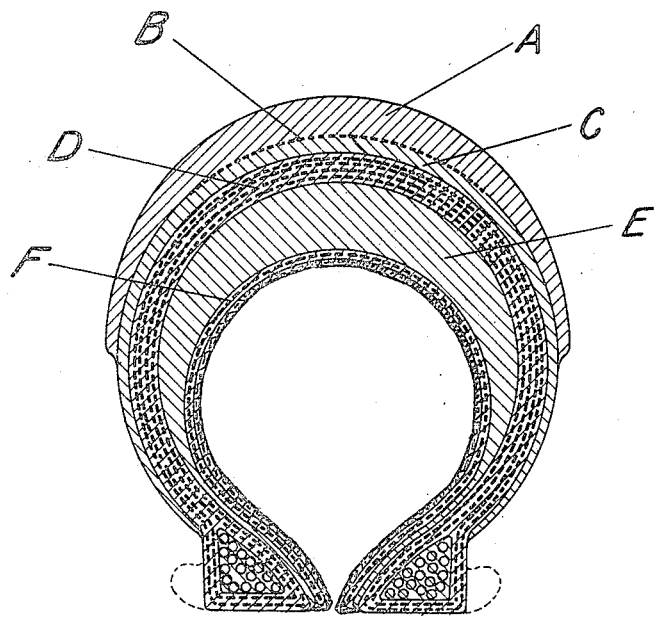
Witnesses
C. W. Taylor
G. M. Moreland
Inventor
Clarence F. A. Gray

UNITED STATES PATENT OFFICE.

CLARENCE F. A. GRAY, OF MONTREAL, QUEBEC, CANADA.

VEHICLE-TIRE.

1,213,476.

Specification of Letters Patent. Patented Jan. 23, 1917.

Application filed November 24, 1913. Serial No. 802,803.

*To all whom it may concern:*

Be it known that I, CLARENCE F. A. GRAY, a subject of the King of Great Britain, and resident of the city of Montreal, in the Province of Quebec and Dominion of Canada, have invented new and useful Improvements in Vehicle-Tires, of which the following is a full, clear, and exact description.

This invention relates to improvements in vehicle tires, and particularly to pneumatic tires for automobiles and the like.

The objects of my invention are, first, to provide a tire casing or shoe of such thickness as to prevent puncture of the inner pneumatic tube without reducing the flexibility or resilience of the tire; second, to greatly minimize or totally prevent the occurrence of blow-outs; and third, to provide a tire which will be more durable than those at present in use.

In the drawing which illustrates my invention, A designates the rubber tread portion, B the breaker strip of fabric, C the rubber cushion, and D the fabric carcass. These elements are all built up and arranged as in the ordinary tire at present in use, but in addition I provide a secondary cushion E of reclaimed rubber or other suitable similar material. This cushion E is vulcanized or otherwise secured to a secondary inner fabric carcass F. The cushion E is further secured to the carcass D by vulcanizing, cementing, or other process, so that the whole tire is handled and operates as a single element.

This shoe or casing may be built up in the usual manner, that is, by placing the several layers of fabric comprising the secondary inner carcass F upon a form, vulcanizing or otherwise securing the rubber compound E to the carcass F, then building over the secondary cushion E the fabric carcass D, building upon same the usual cushion stock C, breaker strip B and tread A. It may, however, be found desirable to cure each carcass separately upon different sized air bags, to obtain equal stretching of the several layers of fabric. In that event, the parts are all intimately secured to each other by cementing and cold curing or cementing and heat curing, as found desirable, or convenient, to form a complete shoe. By constructing a tire in this manner, a casing of added thickness and great durability is formed without detracting from its shock absorbing and resilient qualities. The inner carcass F being protected by the secondary cushion E will not be affected materially by road wear, and this inner carcass will serve to relieve the outer carcass of the strain of internal pneumatic pressure. The fabric forming the outer carcass will therefore not be subjected to the same breaking strain and will flex and not break when encountering stones or like objects upon the road. The combination of the double carcass and double cushion will divide the work of the tire relieving the strain upon the parts, thus eliminating to a great extent the liability to blow-outs, and making the tire more durable than those at present in use. As the strength of the tire depends largely upon the strength of the carcass fabric, the secondary inner carcass will add greatly to the life and durability of the tire.

It is to be noted in particular that, in addition to the formation of a tire constituting a single element, the inner carcass F may be detached with the secondary cushion E, from the outer carcass D in order to permit of access to the inner surface of the latter, should it be perforated, for purposes of repair. It is to be observed, furthermore, that this removal of the inner carcass may be effected without impairing the integrity of the remaining parts constituting the usual shoe.

By reference to the foregoing, it will be understood that, in designating the inner member F as a carcass, a structure is meant which is in all respects identical in construction to the outer carcass, and which in its use in the tire requires the intervention of a cushion between the same and the outer carcass. It is impracticable to increase the thickness of the usual tire by multiplying the number of layers of fabric composing the same, without at the same time increasing the cross-sectional diameter of the tire, because the working or bending in and out of the tire at the tread when traveling over inequalities of the road causes the layers of fabric to separate from each other.

The construction and methods I here describe, allow a great number of plies of fabric in the formation of a tire casing. The resilient secondary cushion allowing a sufficient amount of "give" or "play" between the two groups of fabric layers, and so preventing rupture of cohesion and consequent disunion of the layers.

Having thus described my invention, what I claim is:—

The herein described pneumatic tire shoe comprising a tread, an outer cushion, a strong, tough external stress and wear-resisting carcass on which said cushion and tread are superimposed having its inner edge inclosing a pair of bead elements, an inner carcass of strong dense tough internal pressure-resisting nature within and spaced from the outer carcass, said inner carcass being similar in its construction to the construction of the outer carcass except for the bead elements and having its inner edges spaced from said inner edges of the outer carcass and bead elements, and a secondary cushion of solid resilient material interposed between the two carcasses and filling the whole space between them, said cushion having its entire inner and outer surfaces secured firmly to the inner and outer carcasses respectively whereby to form therewith a single element, and at the same time being capable of removal with the inner carcass to permit of access to the inner surface of the outer carcass without impairing the integrity of the outer carcass, its cushion and tread.

In witness whereof, I have hereunto set my hand in the presence of two witnesses.

CLARENCE F. A. GRAY.

Witnesses:
 F. A. PAULIN,
 FRANK WHITFIELD.